United States Patent

Ban et al.

[11] 4,350,056
[45] Sep. 21, 1982

[54] CONNECTING ROD OF AN INTERNAL COMBUSTION ENGINE

[75] Inventors: Keisuke Ban, Fujimi; Akimasa Daimaru, Asaka, both of Japan

[73] Assignee: Honda Giken Kogyo Kabushiki Kaisha, Tokyo, Japan

[21] Appl. No.: 177,893

[22] Filed: Aug. 14, 1980

[30] Foreign Application Priority Data

Aug. 17, 1979 [JP] Japan .................. 54-104753

[51] Int. Cl.³ .............. G05G 1/00; B22D 19/02; B32B 15/14
[52] U.S. Cl. .................. 74/579 E; 74/579 R
[58] Field of Search .............. 74/579 R, 579 E

[56] References Cited

U.S. PATENT DOCUMENTS 2,588,241 3/1952 Huffman .................. 74/579
4,216,682 8/1980 Ban et al. .................. 74/579 E Primary Examiner—Allan D. Herrmann
Attorney, Agent, or Firm—Posnack, Roberts, Cohen & Spiecens

[57] ABSTRACT

A connecting rod for an internal combustion engine comprising a rod body having a fiber bundle reinforcement integrated therein. The fiber bundle reinforcement extends longitudinally in a central rod portion of the connecting rod and is exposed at the peripheral surface at a small end portion of the rod where a bore is provided for connection with a piston pin. The fiber bundle reinforcement is exposed in the region of the bore adjacent the central rod portion.

10 Claims, 3 Drawing Figures

CONNECTING ROD OF AN INTERNAL COMBUSTION ENGINE

FIELD OF THE INVENTION

The present invention relates to the construction of a connecting rod for an internal combustion engine.

PRIOR ART

The present inventors have proposed a connecting rod for an internal combustion engine made of a lightweight metal reinforced at a predetermined region of the rod portion of any desired cross-section with a bundle of inorganic fibers.

The inventors have conducted various tests with the connecting rod of the above construction and found that the portion of the inner peripheral surface at the bore in the small end, which is made only of a matrix metal such as an aluminum alloy, is worn rapidly at a location adjacent to the rod portion due to a striking effect of the connecting pin of the piston thereat.

This is a natural result of the fact that the small end serves to transmit the pressure of the combustion gases from the piston and piston pin to the connecting rod itself, while being subjected to radiation of heat from the piston whereby the small end is subjected to severe thermal and load conditions.

SUMMARY OF THE INVENTION

An object of the invention is to provide a connecting rod which is free from the disadvantage of rapid wear in the region of the bore in the small end proximate the rod portion.

This and other objects are satisfied by improving the mechanical strength of the peripheral surface of the bore in the small end proximate the rod portion by reinforcing this surface with fibers.

DETAILED DESCRIPTION

Figure 1:
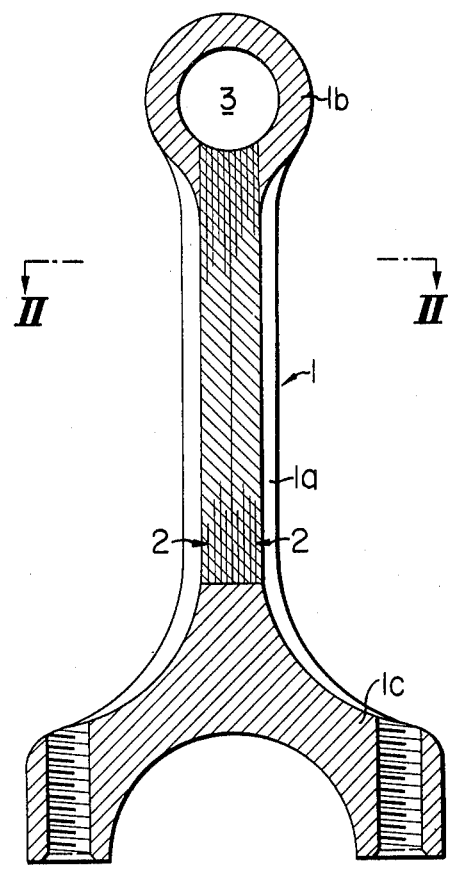
FIG. 1 is a sectional view taken on line I—I in FIG. 2 of a connecting rod constructed in accordance with the invention.

Referring to FIG. 1 therein is seen a connecting rod 1 having a small end 1b and a large end 1c interconnected by a central rod portion 1a. The small end 1b has a bore 3 for receiving a piston pin (not shown). The rod portion 1a has longitudinally extending linear bundles 2 of an inorganic fiber integrated therein by squeeze casting during casting of the connecting rod. The inorganic fibers can be metallic fibers such as stainless steel or ceramic fibers such as silicon carbide. The upper end of each inorganic fiber bundle 2 is extended to and exposed at the portion of the peripheral surface of the bore 3 in the small end 1b closer to the rod portion 1a so as to reinforce that portion. The ends of the bundles 2 conform to the shape of the bore and extend partially therearound.

Figure 3:
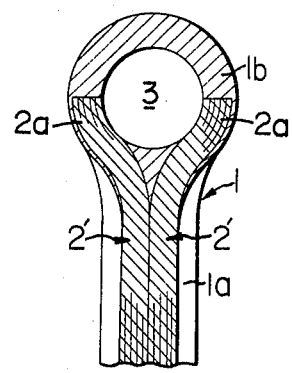
FIG. 3 is a sectional view of a portion of another embodiment of a connecting rod according to the invention.
Figure 2:
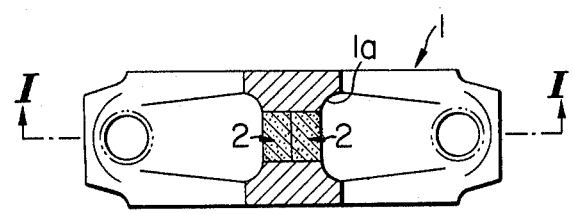
FIG. 2 is a sectional view taken along line II—II in FIG. 1.

FIG. 3 shows another embodiment of the invention in which two bundles 2' of inorganic fiber are arranged in a Y-shape form in the small end 1b and the rod portion 1a of the connecting rod. The upper portion 2a of the Y-shape of the bundles is exposed at the peripheral surface of the bore in the small end 1b to reinforce substantially one-half of the circumference of the peripheral surface.

By reinforcing the portion of the peripheral surface at the bore in the small end 1b adjacent the rod portion 1a with fibers, the mechanical strength at said portion is increased to ensure an anti-creep characteristic and to provide strength against wear due to striking sufficient to withstand the severe thermal and load conditions.

As has been described, according to the invention, the portion of the inner peripheral surface at the bore in the small end 1b adjacent the rod portion 1a is reinforced by the continuous fibers of bundles 2 extended to and exposed at said portion, so that it is possible to obtain a balance of mechanical strength of the connecting rod as a whole to ensure safe transmission of the pressure acting on the piston to the crank shaft.

The advantages of the invention are also obtained when it is employed with a connecting rod of a piston-pin press-fit type and a connecting rod of floating type.

Although the invention has been described in relation to preferred embodiments thereof, it will become apparent to those skilled in the art that numerous modifications and variations can be made without departing from the scope and spirit of the invention as defined in the attached claims.

What is claimed is:

1. A connecting rod for an internal combustion engine comprising a rod body and a fiber bundle integrated in said rod body to reinforce said body, said rod body including a small end portion with a bore therein, a central rod portion and a large end portion, said fiber bundle extending in said central rod portion and being exposed at said small end portion at said bore.

2. A connecting rod as claimed in claim 1 wherein said fiber bundle is exposed at said bore in the region thereof adjacent said central rod portion.

3. A connecting rod as claimed in claim 2 wherein said exposed fiber bundle extends over a portion of the peripheral surface of said rod body around said bore.

4. A connecting rod as claimed in claim 3 wherein said fiber bundle has an end which is exposed at said bore.

5. A connecting rod as claimed in claim 4 wherein said end is rounded to conform to the shape of said bore.

6. A connecting rod as claimed in claim 2 wherein said fiber bundle includes two adjacent bundle portions.

7. A connecting rod as claimed in claim 6 wherein said bundle portions extend longitudinally and have ends which are exposed at said bore and conform to the shape thereof.

8. A connecting rod as claimed in claim 6 wherein said bundle is of Y-shape with a straight portion extending longitudinally in said central rod portion and said bundle portions branch apart and extend into said small end portion on opposite sides of said bore.

9. A connecting rod as claimed in claim 8 wherein the parts of said bundle portions which branch apart and extend into said small end portion have inner surfaces which are exposed at said bore and extend partly therearound.

10. A connecting rod as claimed in claim 2 wherein said bundle of fibers extend continuously between said central rod portion and said small end portion.

* * * * *